United States Patent [19]

Bertrand et al.

[11] Patent Number: 5,152,971

[45] Date of Patent: Oct. 6, 1992

[54] PRODUCTION OF HIGH MOLECULAR WEIGHT, ESSENTIALLY UNCROSSLINKED POLYCHLOROPHOSPHAZENES

[75] Inventors: Joel Bertrand, Castanet; Philippe Potin, Billere, both of France

[73] Assignee: Atochem, Puteaux, France

[21] Appl. No.: 525,727

[22] Filed: May 21, 1990

[30] Foreign Application Priority Data

May 19, 1989 [FR] France ................................ 89 06565

[51] Int. Cl.$^5$ .......................................... C01B 25/10
[52] U.S. Cl. .................................. 423/300; 366/320; 422/135
[58] Field of Search ............... 423/300, 320, 321, 309, 423/312; 366/144, 149, 279, 318, 319, 96, 97, 98

[56] References Cited

U.S. PATENT DOCUMENTS

| | | | |
|---|---|---|---|
| 2,082,796 | 6/1937 | Gaertner | 366/320 |
| 2,247,439 | 7/1941 | Hawes | 366/320 |
| 2,939,770 | 6/1960 | Schwartkopff et al. | 366/149 |
| 3,315,947 | 4/1967 | Nauta | 366/320 |
| 3,365,177 | 1/1968 | Daman | 366/321 |
| 4,460,278 | 7/1984 | Matsubara et al. | 366/320 |
| 4,472,063 | 9/1984 | Eickelmann | 366/320 |
| 4,544,536 | 10/1985 | De Jaeger et al. | 423/300 |
| 4,693,876 | 9/1987 | De Jaeger et al. | 423/300 |

OTHER PUBLICATIONS

C. K. Coyle et al, "Mixing in Viscous Liquids," *AIChE Journal*, vol. 16, No. 6 (Nov., 1970), pp. 903-906.

Primary Examiner—Wayne Langel
Attorney, Agent, or Firm—Burns, Doane, Swecker & Mathis

[57] ABSTRACT

High molecular weight, essentially uncrosslinked polychlorophosphazenes are prepared by bulk polycondensing a monomer of the formula $P_2NXCl_2$, in which X is an oxygen or sulfur atom, e.g., N-dichlorophosphoryl- or N-dichlorothiophosphoryl-P-trichlorophosphazene, and wherein at least that final stage of polycondensation following cessation of evolution of $PXCl_3$ is carried out in a stirred reaction zone, such stirred reaction zone including means to prevent the accumulation of polycondensate on the stirrer.

7 Claims, 3 Drawing Sheets

PRODUCTION OF HIGH MOLECULAR WEIGHT, ESSENTIALLY UNCROSSLINKED POLYCHLOROPHOSPHAZENES

BACKGROUND OF THE INVENTION

1. Field of the Invention

The present invention relates to the preparation of linear polychlorophosphazenes having a terminal -PXCl$_2$ group, in which X is an oxygen or sulfur atom, by polycondensation of N-dichlorophosphoryl- or N-dichlorothiophosphoryl-P-trichlorophosphazene (P$_2$NXCl$_5$).

2. Description of the Prior Art

It is known to this art that linear polychlorophosphazenes having a terminal —PXCl$_2$ group are formed by heating the compounds of the formula P$_2$NXCl$_5$ under conditions of pressure and temperature suited to the release of PXCl$_3$.

Thus, French Patent No. 79/24,037 (publication No. 2,466,435) describes the preparation of linear polychlorophosphazenes which have a terminal dichlorophosphoryl group of the formula —POCl$_2$, by polycondensing the compound P-trichloro-N-dichlorophosphorylmonophosphazene of empirical formula P$_2$NOCl$_5$ under conditions of pressure and temperature selected to release POCl$_3$.

French Patent Application No. 83/11,264 (publication No. 2,548,652) describes the preparation of linear polychlorophosphazenes which have a terminal dichlorothiophosphoryl group of the formula -PSCl$_2$, by polycondensing the compound P-trichloro-N-dichlorothiophosphorylmonophosphazene of empirical formula P$_2$NSCl$_5$ under conditions of pressure and temperature conditions which are suited to the release of PSCl$_3$.

These linear polychlorophosphazene having a terminal —PXC$_2$ group correspond to the following empirical formula:

$$Cl_2(X)P\text{-}[NPCl_2]_n\text{-}Cl \quad (I)$$

in which n is a number equal to or greater than 4, and wherein the maximum value of n can be 5,000 or even more.

Despite undoubted advantages, the most notable of which being its simplicity, the high degree of conversion of the monomer and the relatively low cost of such monomer, the above-mentioned process for the preparation of linear polychlorophosphazenes having a terminal —PXCl$_2$ group by thermal polycondensation of the monomer P$_2$NXCl$_5$ is not wholly satisfactory, because it does not permit reproducibly attaining high degrees of polycondensation.

Indeed, when the evolution of PXCl$_3$ ceases, the average degree of polycondensation of the resulting linear polychlorophosphazenes is low, namely, n is on the order of 20 to 30; this indicates that said polychlorophosphazenes are short-chain polymers. To obtain a polycondensate which has a higher degree of polycondensation, these short-chain polymers must react together via their chain ends to form long-chain polymers, and this mandates continuing the polycondensation after the evolution of the compound PXCl$_3$ has ceased. The progress of this second stage of polycondensation is difficult to control and obtaining uncrosslinked polychlorophosphazenes which have degrees of polycondensation that are higher than approximately 500 remains a random process. In fact, the risk of crosslinking increases with the increase in the length of the polymer chains, and this phenomenon develops in a manner which can vary from one test to another. This results, therefore, in a mediocre reproducibility when attempting to attain high degrees of polycondensation. Such constitutes a severe handicap for an industrial application of the bulk process, because most of the applications of linear polychlorophosphazenes require polymers which have high degrees of polycondensation.

Moreover, this technique of polycondensation is generally carried out in a stirred reactor of a common type, comprising a vessel heated by elements in the wall members thereof and being equipped with an anchor stirrer. With this apparatus, the bulk polycondensation must be terminated at a molecular weight value which is limited at most to about 100,000, at the risk of crosslinking and producing an insoluble and unusable polymer.

French Patent No. 84/15,892 (publication No. 2,571,710) describes carrying out the polycondensation, either wholly or during its final stage, in solution. This improvement imparts to the polycondensate a great resistance to crosslinking phenomena and makes it possible to obtain a linear polydichlorophosphazene having a high molecular weight.

However, this latter process presents a certain number of disadvantages associated with the use of solvents. Indeed, such solvents must be of high purity and carefully dehydrated. At the very high temperatures at which the polycondensation is carried out, the presence of a solvent makes it necessary to conduct the operation under pressure. The combination of the high temperatures, of the pressure and of a highly corrosive environment presents equipment problems which are difficult to solve. The fact of operating in solution results in additional cost of the reactor, which must be larger in size and which must withstand pressure. Finally, the solvent must be separated from the polymer and purified, to be recycled.

SUMMARY OF THE INVENTION

Accordingly, a major object of the present invention is the provision of an improved process for the preparation of polychlorophosphazenes having high molecular weights, for example higher than 500,000.

Another object of the present invention is the provision of an improved process for the polycondensation of phosphazenes to a high degree, without concomitant crosslinking of the polycondensate.

Still another object of this invention is the provision of homogeneous polychlorophosphazenes having a good molecular weight distribution which are perfectly soluble in the usual solvents for polychlorophosphazene, for example in tetrahydrofuran.

Briefly, the present invention features a process for the bulk preparation of polychlorophosphazenes from P$_2$NXCl$_5$, in which X is an oxygen or sulfur atom, and wherein at least the polycondensation stage following cessation of the evolution of PXCl$_3$ (final stage) is carried out in a substantially vertical cylindrical reactor comprising, in the polycondensation zone of which, a stirring system and stationary (static) or mobile (dynamic) components preventing the accumulation of the polycondensate on the said stirring system.

DETAILED DESCRIPTION OF THE PREFERRED EMBODIMENTS OF THE INVENTION

Figure 1:
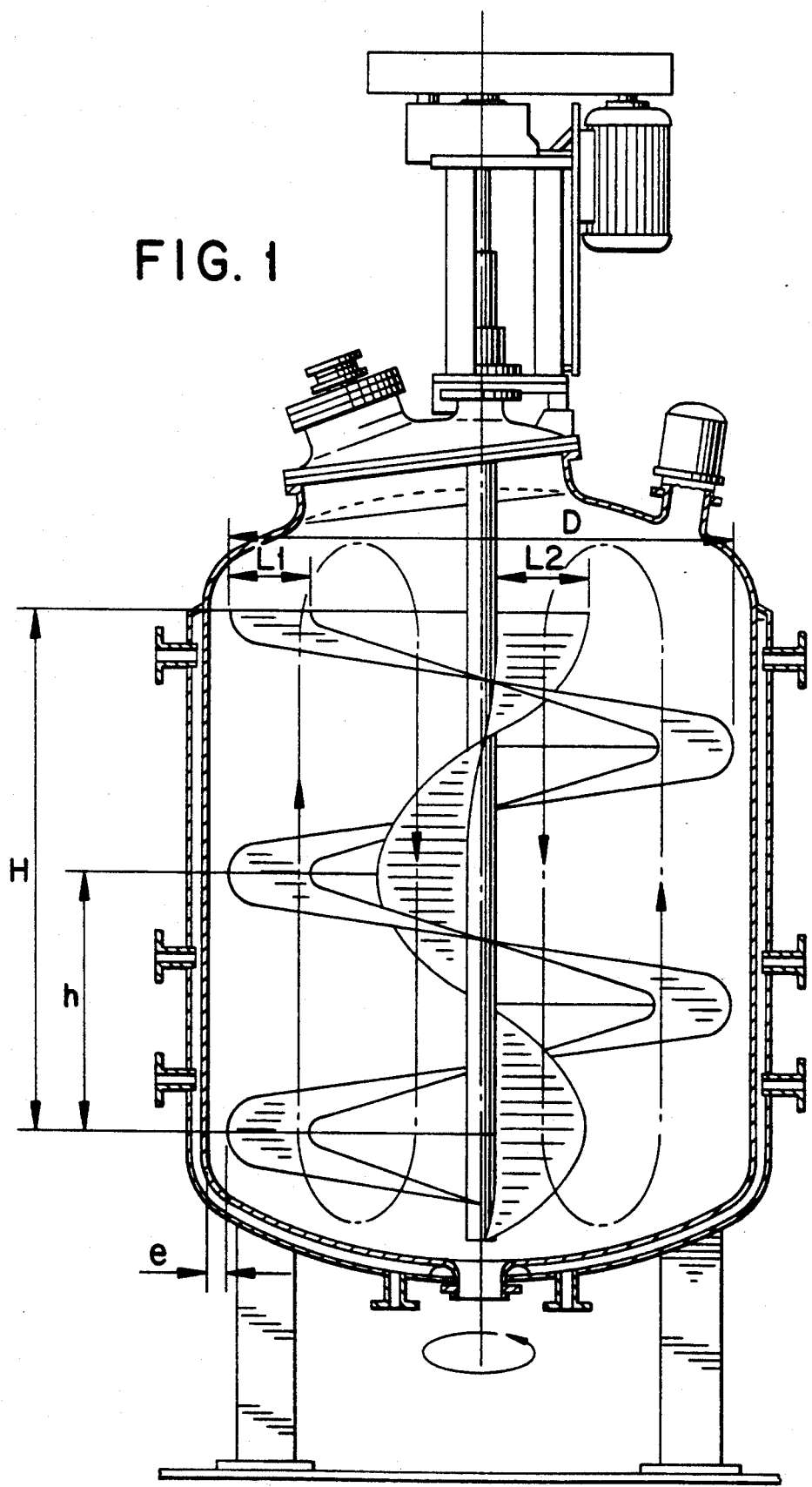
FIG. 1 is a front elevational view, with housing partially broken away to show internal structure, of one embodiment of apparatus for carrying out the process according to the invention.

More particularly according to the present invention, the subject process is conducted such that the final stage of the polycondensation is carried out in a substantially vertical cylindrical reactor, comprising:

(A) at least one stirring means which comprises a helical band, the axis of rotation of which being substantially parallel to the generatrix of the cylinder defining the reactor, the geometry of said helical band and its direction of rotation effecting an essentially downward movement of the polycondensate being formed in the section of the reactor constituted by one or more cylinders of revolution whose axis or axes is (are) established by the axis or axes of rotation of the stirrer(s), and (B) one or more mobile elements securedly attached or unattached to the stirrer(s) indicated under (A) and/or one or more stationary elements, securedly attached to the reactor and designed to impart to the polycondensate an essentially upward movement in the remaining section of the reactor, the volume represented by the cylinder or plurality of cylinders of revolution representing substantially one half of the volume of the reactor actually occupied by the polycondensate.

The present invention relates very particularly to a process for the preparation of polychlorophosphazenes by polycondensation of $P_2NXCl_5$, such process being carried out in a cylindrical vertical reactor comprising a vertical stirrer (VS), the axis of rotation of which coincides with the axis of the aforementioned cylindrical reactor. The said stirrer (VS), comprises a shaft and a helical band wound onto this shaft, the direction of winding of the band being fixed relative to the direction of rotation of the stirrer (VS) for the purpose of providing a movement of the material essentially from the top downwards in the vicinity of the said stirrer. The reactor also comprises a second stirring system creating an essentially upward movement in close proximity to the wall of the reactor.

The second stirring system may be securedly attached to the stirrer (VA). By way of illustration of securedly attached systems, representative are the helical bands affixed to the same shaft as the stirrer VS at a certain distance from the said shaft, the direction of winding of the said bands being reversed relative to that of the band of the stirrer VS. Anchor stirrers are also representative, which are securedly attached to the shaft of the stirrer VS, the blades of the said anchor being preferably inclined on either side of the plane of symmetry of the reactor, at an angle which may range, for example, from 10° to 30°.

When a complex system comprising a twin helical band, such as indicated above, is used, said bands advantageously have a blade width representing from 10% to 40% of the internal radius of the reactor, the inner band (constituting the stirrer VS) being preferably secured directly to the stirrer shaft, the inner edge of the outer band (used to create the upward vertical movement) being securedly affixed at various points to the stirrer shaft, at a distance which advantageously ranges from approximately 40% to approximately 60% of the internal radius of the reactor (a distance measured from the axis of the stirring shaft). In a system of this type comprising a twin helical band, the pitch of the helical windings generally ranges from 10% to 100% of the working height of the reactor (1 to 10 turns).

When a system comprising a stirrer VS having a helical band and an anchor-stirrer type system is employed, the width of the band may advantageously represent 10% to 60% and preferably 15% to 50% of the internal radius of the reactor, the blades of the anchor-stirrer, which are preferably inclined as indicated above, substantially matching the shape of the base of the reactor and ascending along the cylindrical wall over a height which may range from approximately 30% to approximately 70% of the working height of the reactor.

By the expression "working height of the reactor" is intended the height of the section of the reactor occupied by the polycondensate being formed and/or formed.

In an alternative embodiment, the second stirring system may not be secured attached to the stirrer (VS). This counter-stirring, namely, that directed from the bottom upwards, may be provided by the use of stationary (static) components, securedly attached to the wall of the reactor itself, whether to the side, namely, the cylindrical wall, or to the ends of the cylinder, or (dynamic) mobile components such as, for example, an anchor-stirrer of the type referred to above but mounted on a shaft other than that of the stirrer VS.

FIG. 1 illustrates a system comprising two helical bands securedly attached to the same shaft. The rotation of this shaft will drive, by means of the inner band, the reaction mass in a downward vertical direction, the said mass being engaged again by the outer band in an essentially upward vertical direction.

Figure 2:
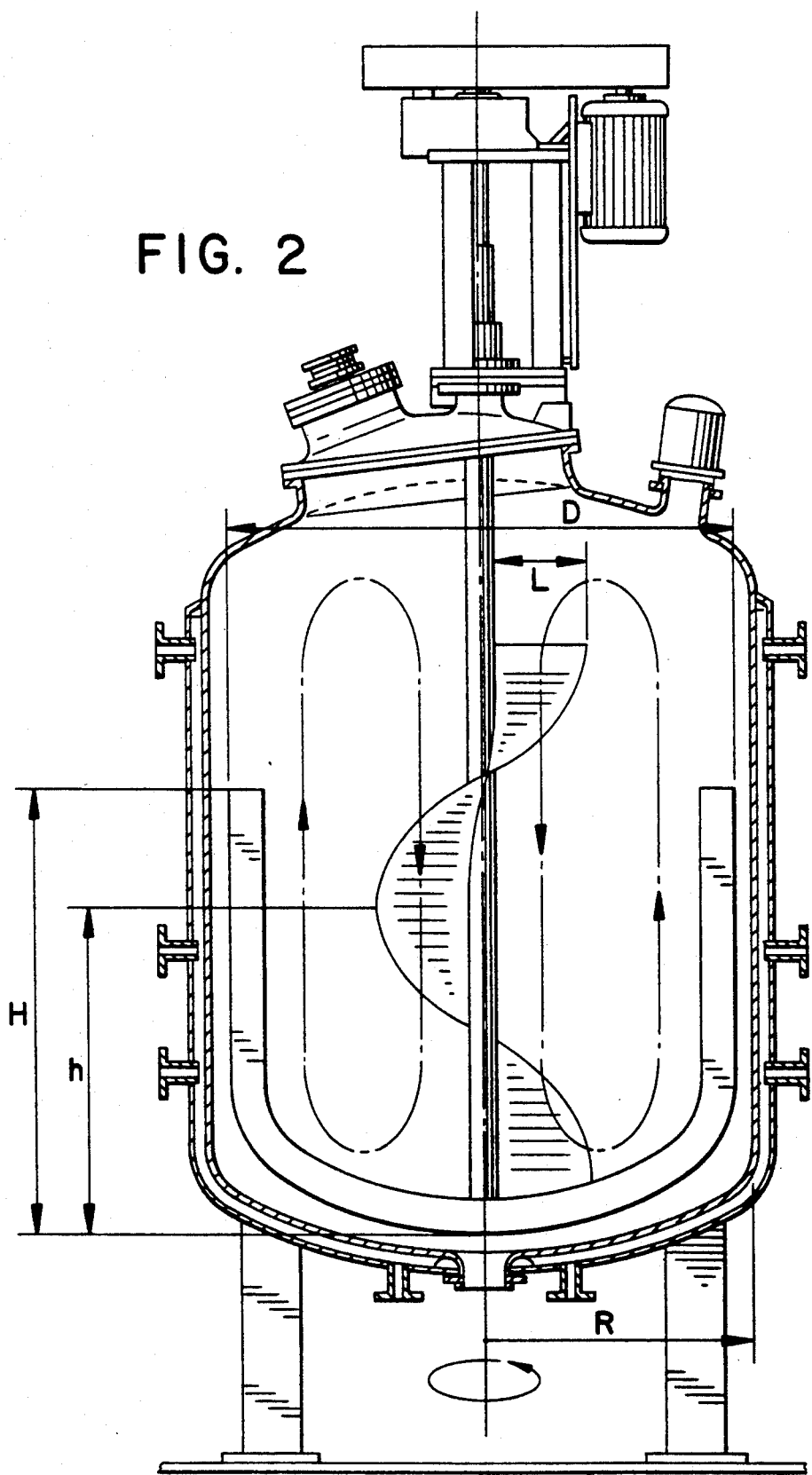
FIGS. 2 and 3 are like views of other embodiments of apparatus for carrying out the process of the invention.

In FIG. 2, the outer helical band is replaced by an anchor-stirrer.

Figure 3:
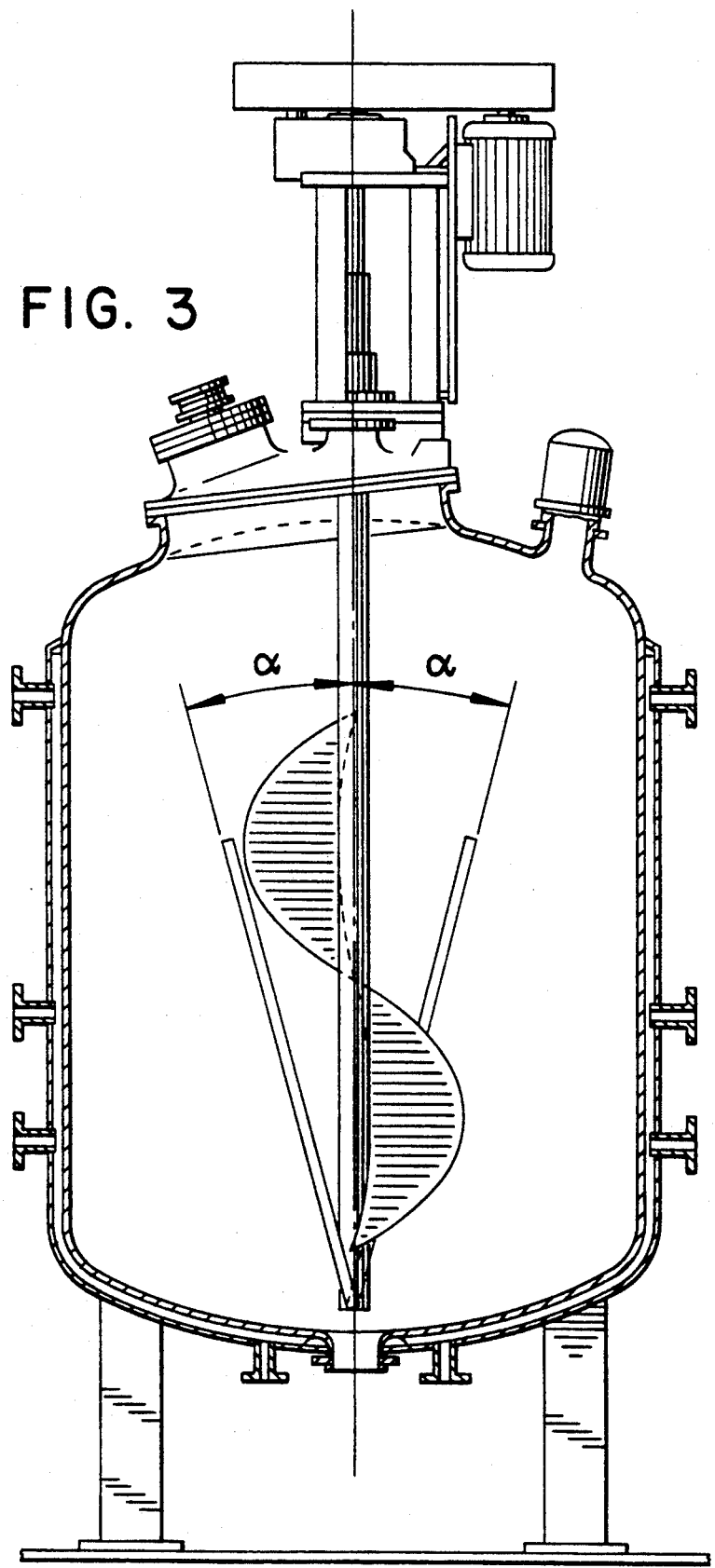

In FIG. 3, the respective preferred positions of the blades of the anchor-stirrer are illustrated, i.e., these blades form an angle on either side of the plane or symmetry passing through the axis of rotation of the stirrer formed by the helical band.

It is also within the scope of the invention to employ other stirring systems capable of imparting to the bulk of the polychlorophosphazene being formed such movement as to prevent the accumulation of the polychlorophosphazene on the stirring means.

The process of the present invention may be used for the preparation of polychlorophosphazene according to the techniques referred to above and described, for example, in French Patents 2,466,435 and 2,548,652, hereby expressly incorporated by reference. The final polychlorophosphazenes themselves may also be substituted, especially by phenoxy or fluoroalkoxy groups, for example according to the technique described in U.S. Pat. Nos. 3,515,688, 4,514,550, 3,970,553 and 4,576,806, or in published French Patent Application No. 87/14,215.

In order to further illustrate the present invention and the advantages thereof, the following specific examples are given, it being understood that same are intended only as illustrative and in nowise limitative.

EXAMPLE 1

A reactor equipped with a twin helical band, as shown in FIG. 1, was employed. The symbols indicated in FIG. 1 had the following values (in mm):
D=290
H=180
h=90
$L_1$=43.5
$L_2$=54
e=5.

Into this reactor were introduced 20 kg (74.2 moles) of dichlorophosphoryltrichlorophosphazene ($P_2NOCl_5$). The contents were heated to 280° C., under nitrogen atmosphere, with the stirrer rotating at 30 rev/min.

The evolution of phosphorus oxychloride corresponding to 95% of the theoretical amount, i.e., 8.5 kg, ceased after 4.42 hours of reaction. The polycondensation was continued and monitored as a function of time by intrinsic viscosity measurements. The following change was observed:

| Time (h) | [η] THF 30° (ml/g) |
| --- | --- |
| 12.8 | 28.8 |
| 19.3 | 36.9 |
| 26.3 | 56.2 |

The reactor was cooled to 100°. 10 l of toluene were introduced. After 4 h of stirring, a solution of polydichlorophosphazene which was free from insoluble fraction was obtained.

100 g of this solution (0.859 chlorine equivalent) were diluted in 400 ml of toluene and poured into a solution containing 109.6 g of sodium phenate (0.945 mole) in 1 l of diethylene glycol dimethyl ether. The entire mass was reacted at 120° under inert gas for 24 hours. The reaction mixture was concentrated to one third of its volume and poured into 3 l of methanol. The precipitated polymer was dissolved in the minimum amount of THF and reprecipitated in water. After drying, 82 g of polymer were obtained, the characteristics of which were as follows:
$[\eta]_{30°}{}^{THF}$=69 ml/g
$\overline{M}w$=625,000

The molecular weight was measured by light scattering in the polymer in solution in THF containing 0.1 mole per liter of LiBr at 30° C.

EXAMPLE 2

The procedure of Example 1 was repeated in the same reactor, but in which the stirring rotor had been replaced by that shown in FIGS. 2 and 3, in which the indicated symbols had the following values (in mm):
H=180
h=90
D=290
L=54
R=150
α=15°

An amount of $P_2NOCl_5$ identical with that of Example was introduced into this reactor and heated under the same conditions. The evolution of phosphorus oxychloride, corresponding to 95% of the theoretical amount, i.e., 8.5 kg, ceased after 6.15 hours of reaction. The polycondensate was maintained under the same conditions and its progress was monitored as a function of time:

| Time (h) | [η] THF 30° (ml/g) |
| --- | --- |
| 33.5 | 48.2 |
| 38.7 | 55.3 |

The reactor was cooled to 100°. 10 l of toluene were introduced. After 4 hours of stirring, a solution of polydichlorophosphazene free from insoluble fraction was obtained.

The solution was treated in a manner identical with that described in Example 1. A polydiphenoxyphosphazene which had the following properties was thus obtained:
$[\eta]_{30°}{}^{THF}$=67.5 ml/g
$\overline{M}w$=605,000

EXAMPLE 3 (comparative)

The procedure of Example 2 was repeated, using a reactor comprising only the anchor-stirrer whose blade height (corresponding to H in Example 2) was 180 mm.

Into this reactor were introduced 20 kg (74.2 moles) of dichlorophosphoryltrichlorophosphazene ($P_2NOCl_5$). The reactor was heated to 280° C. under an inert atmosphere and with stirring. An evolution of phosphorus oxychloride was observed, corresponding to 95% of the theoretical amount, i.e., 10.8 kg, over 4.5 hours of reaction. The polycondensation was continued and at the end of 5 hours a sample was withdrawn, this intrinsic viscosity of which was measured (at 30° in THF). The latter was 22 ml/g. At the end of 6 hours a rise of the polymer along the stirring shaft was observed and, 10 minutes later, all of the polycondensate was firmly attached to the anchor.

The reactor was then cooled to 100°. 10 l of toluene were introduced. After 24 hours of stirring at this temperature, a negligible amount of polydichlorophosphazene had gone into solution. Virtually all of the polycondensate was in the form of an insoluble gel, swollen by the solvent.

While the invention has been described in terns of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of an essentially uncrosslinked polychlorophosphazene, having a molecular weight of at least 500,000 which comprises bulk polycondensing a monomer of the formula $P_2NXCl_2$, in which X is an oxygen or sulfur atom, including conducting at least that stage of polycondensation following cessation of evolution of $PXCl_3$ in a stirred reaction zone, and said stirred reaction zone comprising means to prevent the accumulation of polycondensate on the stirrer.

2. The process as defined by claim 1, said stirred reaction zone comprising a substantially vertical cylindrical reactor, means for stirring the polycondensate content thereof, and at least one element for preventing the accumulation of polycondensate on said stirring means.

3. The process as defined by claim 2, said at least one element for preventing the accumulation of polycondensate on the stirring means comprising at least one static element.

4. The process as defined by claim 2, said at least one element for preventing the accumulation of polycondensate on the stirring means comprising at least one dynamic element.

5. The process as defined by claim 2, said stirred, substantially vertical cylindrical reactor comprising:
(A) at least one rotating stirrer which comprises a helical band, the axis of rotation of said at least one stirrer being substantially parallel to the generatrix of the cylinder constituting the reactor, the geometry of said helical band and its direction of rotation being adapted to effect an essentially downward movement of the polycondensate being formed in said reactor; and
(B) at least one dynamic element securedly affixed or unaffixed to said at least one stirrer (A) and/or at least one static element securedly affixed to the reactor, and adapted to impart an essentially upward movement to the polycondensate.

6. A high and homogeneously distributed molecular weight, essentially uncrosslinked, bulk polycondensed polychlorophosphazene having terminal $-PXCl_2$ groups, in which X is an oxygen or sulfur atom said bulk polycondensed polychlorophosphazene having a molecular weight of at least 500,000.

7. The polychlorophosphazene product of the process as defined by claim 1, having a molecular weight of at least 500,000.

* * * * *